United States Patent [19]

Hirota et al.

[11] 4,402,022

[45] Aug. 30, 1983

[54] TRACKING CONTROL SYSTEM IN A MAGNETIC REPRODUCING APPARATUS

[75] Inventors: Akira Hirota, Chigasaki; Seisuke Hiraguri, Yokohama, both of Japan

[73] Assignee: Victor Company of Japan, Ltd., Yokohama, Japan

[21] Appl. No.: 225,006

[22] Filed: Jan. 14, 1981

[30] Foreign Application Priority Data

Jan. 17, 1980 [JP] Japan .................................. 55-4007

[51] Int. Cl.³ ............................................ G11B 21/10
[52] U.S. Cl. ................................................... 360/77
[58] Field of Search ..................... 360/77, 70, 10, 107, 360/109, 75

[56] References Cited

U.S. PATENT DOCUMENTS

| | | | |
|---|---|---|---|
| 4,104,684 | 8/1978 | Wakami et al. | 360/70 |
| 4,148,082 | 4/1979 | Okada et al. | 360/77 |
| 4,148,083 | 4/1979 | Watanabe | 360/77 |
| 4,167,762 | 9/1979 | Hashizaki et al. | 360/77 |
| 4,255,768 | 3/1981 | Kubota | 360/10 |
| 4,297,731 | 10/1981 | Melwisch et al. | 360/70 |

*Primary Examiner*—Alfred H. Eddleman
*Attorney, Agent, or Firm*—Louis Bernat

[57] ABSTRACT

A tracking control system is used in a magnetic reproducing apparatus which comprises a rotary magnetic head for successively reproducing recorded signals from parallel tracks existing obliquely with respect to the longitudinal direction of a magnetic tape. The tracking system comprises a head swinging mechanism for varying the height position of the rotary magnetic head, and swinging the tracing position of the rotary magnetic head with respect to the track of the magnetic tape in the width direction of the track, a head swinging voltage generating circuit for generating a head swinging voltage, one or a plurality of memories for sampling and memorizing a voltage which is to be supplied to the head swinging means, at a point in time corresponding to when the rotary magnetic head passes one or a plurality of predetermined relative tracing positions respective of the magnetic tape, a level detecting circuit for detecting the level of a signal reproduced by the rotary magnetic head at a point in time identical to that of the above, a maximum level detecting circuit for detecting whether the level detected by the level detecting circuit has reached a maximum, a control circuit for enabling the reading-out of the voltage memorized in the memory upon detection of the maximum level by the maximum level detecting circuit, and an adding circuit for adding the voltage read out from the memory and the head swinging voltage supplied from the head swinging voltage generating circuit, and supplying the added voltage to the head swinging mechanism.

6 Claims, 29 Drawing Figures

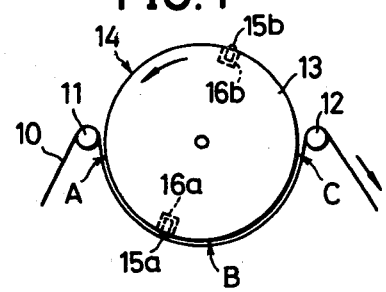
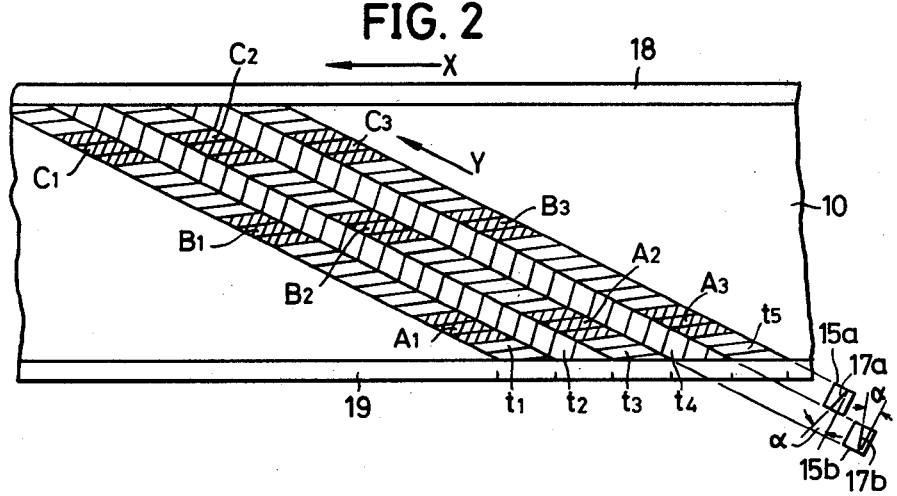
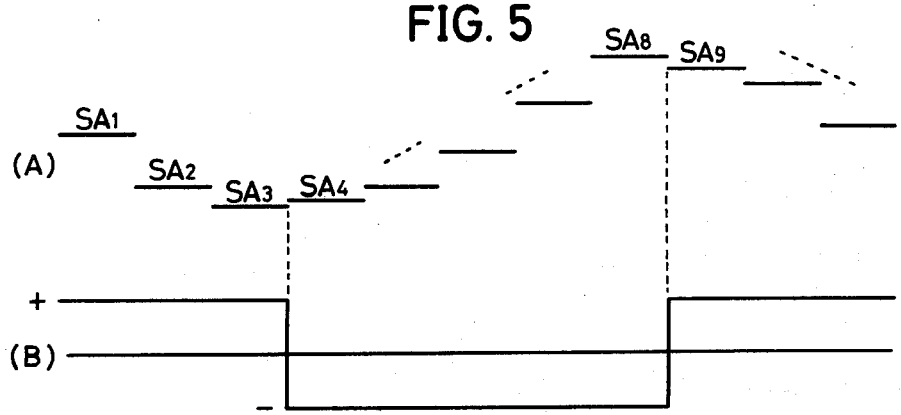

TRACKING CONTROL SYSTEM IN A MAGNETIC REPRODUCING APPARATUS

BACKGROUND OF THE INVENTION

The present invention relates generally to tracking control systems in magnetic reproducing apparatuses, and more particularly to a tracking control system which controls the tracking of a rotary head on a track of a magnetic tape so that the rotary magnetic head finely follows and traces the track on the magnetic tape regardless of the bends in the tracks.

Magnetic recording and/or reproducing apparatuses (hereinafter referred to as VTRs) which record and/or reproduce video signals in oblique tracks on the magnetic tape by use of a rotary magnetic head, has been in wide practical use. Moreover, in order to extend the recording and/or reproducing time of the VTR for home use, by using a magnetic head with a narrow track width and reducing the tape travelling speed into one-third the normal speed, for example, a VTR constructed to perform six hours of recording and/or reproduction, which is three times the length of the normal recording and/or reproducing time of a cassette tape for performing two hours of recording and/or reproduction, has been put into practical use. In this type of VTR, there exist some degradation in the signal-to-noise (S/N) ratio compared to the two-hour recording and/or reproduction, however, six hours of recording and/or reproduction can be obtained having enough practical S/N ratio.

When recording and/or reproduction is performed for a long time by reducing the track pitch and the like, the recording and/or reproduction is easily affected by the track error as compared to normal recording and/or reproduction in which the track width and track pitch are large, and it is essentially required to obtain accurate tracking.

Therefore, the size, angle, and the like of the tape driving system mechanism differ according to the magnetic recording and/or reproducing apparatus, and in reality, there are some variations in the tape driving system. The variations in the size and shape of the tape guiding groove formed in the fixed guide drum, mounting height and mounting angle of the tape travelling guide pole, the mounting location and mounting angle of the fixed guide drum, and the like are the main reasons for the above variation in the tape driving system mechanism. Accordingly, when a magnetic tape which has been recorded by one VTR is reproduced by another VTR, bend is relatively introduced in the track on the magnetic tape with respect to the scanning locus of the rotary magnetic head. When this kind of bend in the track exist, the rotary magnetic head introduces tracking error. Furthermore, when variations exist in each VTR for the length between the position where the rotary magnetic head makes contact with the magnetic tape and the control head where the recording and/or reproduction of control signals on the tape are performed, along the length of the tape travelling path, tracking error is also introduced. When the above described tracking error exist, reproduction having good S/N ratio cannot be obtained.

Conventionally, as a system for compensating and controlling the above tracking error, a system exists in which tracking compensation is performed by using a head moving mechanism which varies the height position of the rotary magnetic head by a control signal, swings the head during the tracing period of each track by applying a constant frequency signal of 480 Hz, for example, to the head moving mechanism, detects the tracking error quantity and the shift direction by the variation in the reproduced signal level, and obtains a control signal from the detected result thus obtained and feeds back this control signal to the head moving mechanism.

However, in the above conventional system, the head is swung several times during scanning of each track by the head and suffered disadvantages in that the level variation in the reproduced signal is large. Furthermore, when this system is applied to a so-called azimuth recording and/or reproducing system in which recording and/or reproduction is performed by use of a pair of heads comprising gaps having azimuth angles of mutually opposite directions, defect is introduced in which color unevenness is introduced by the time axis variation accompanied by the swinging of the heads, since the head gaps form a certain angle with respect to the swinging direction of the heads. Moreover, since the tracking error compensation is successively performed during scanning of one track in this system, accurate tracking compensation cannot be performed when the responding operation of the above head moving mechanism is slow, and suffered such disadvantages in that the tracking error can be increased rather than be reduced.

The present inventor has conceived about the bend in the track, and found that the track bend does not differ at each track, and that bend is introduced in common at each adjacent track due to the variety of variations in the tape driving system of each of the above recording and/or reproducing apparatus. Hence, a track bend identical to that existing at a part of a tape which is a certain distance from the edge of the tape of a certain track, is introduced at a part which is a certain distance from the edge of the tape as the above, throughout the whole distance in the tape longitudinal direction. Accordingly, the present inventor perceived on this point.

SUMMARY OF THE INVENTION

Accordingly, a general object of the present invention is to provide a novel and useful tracking control system in a magnetic reproducing apparatus which has overcome the disadvantages associated with the conventional system.

Another and more specific object of the present invention is to provide a system comprising head swinging means for varying the height position of a rotary magnetic head to swing the tracing position of the rotary magnetic head with respect to the track on a magnetic tape, in the track width direction, head swinging voltage generating means for generating a head swinging voltage, one or a plurality of memory means for sampling and memorizing the voltage which is to be supplied to the head swinging means at a point in time corresponding to when the rotary magnetic head passes one or a plurality of predetermined relative tracing position respective of the magnetic tape, level detection means for detecting the level of the signal reproduced by the rotary magnetic head at a point in time identical to that of the above, maximum level detection means for detecting whether the level detected by the above level detection means has reached a maximum value, control means for reading out the voltage memorized in the above memory means upon detection of the maximum level by the maximum level detection means, and adding means for adding the voltage read out from the memory means with the head swinging voltage supplied from the above head swinging voltage generating means and supplying the added result to the above head swinging means. According to the system of the present invention, even when reproducing a magnetic tape which has been recorded by an apparatus using a recording and/or reproducing system in which the track width is narrow, on another apparatus, the problem concerning the tracking error can finely be eliminated.

BRIEF DESCRIPTION OF THE DRAWINGS

FIG. 1 is a diagram showing the relationship between a rotary magnetic head and a magnetic tape travelling path for explaining reproduced signal level detection points of a system according to the present invention;

FIG. 2 is a diagram for explaining the relationship between track patterns of the magnetic tape and the reproduced signal level detection points;

FIGS. 5(A) and 5(B) are graphs, respectively, for explaining the reproduced signal level detecting operation in the system of the present invention;

DETAILED DESCRIPTION

Figure 3:
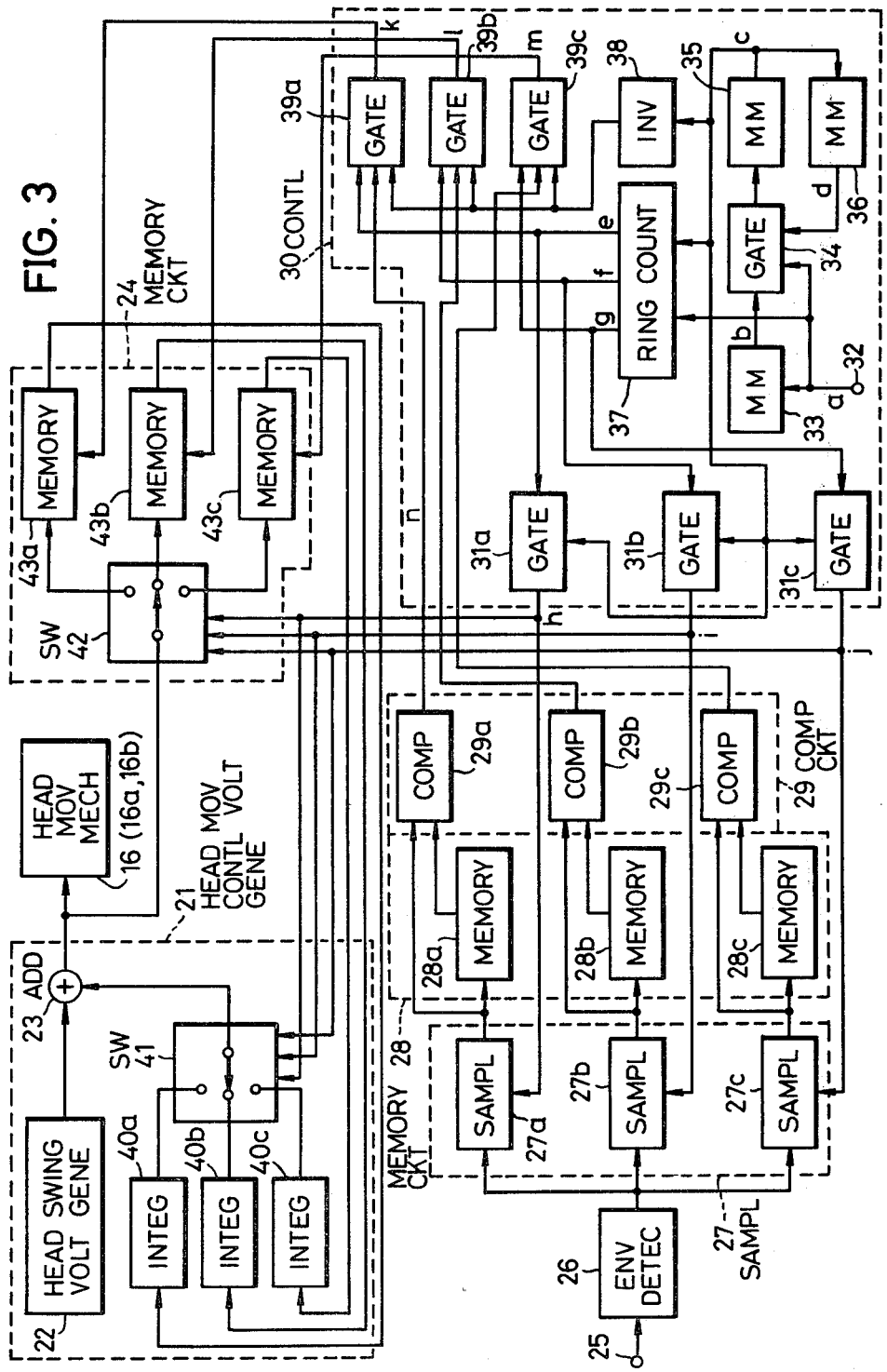
FIG. 3 is a systematic block diagram showing a first embodiment of a tracking control system according to the present invention.

In FIG. 1, a magnetic tape 10 is guided by guide poles 11 and 12, and obliquely guided to a guide drum 14 comprising a fixed drum (not shown) and a rotary drum 13, to travel in the direction of the arrow. The magnetic tape 10 travels making contact with the guide drum 14 in a predetermined angle range (an angle slightly larger than 180 degrees) regulated by the guide poles 11 and 12. A pair of rotary magnetic heads 15a and 15b are provided on the rotary drum 13 at positions mutually opposing each other in the diametric direction. The rotary magnetic heads 15a and 15b are respectively supported by head moving mechanisms 16a and 16.

As the head moving mechanisms 16a and 16b, although not shown in the drawings, mechanisms of known construction can be used in which a known flexion type bimorph comprising a pair of piezoelectric ceramic plates having mutually different flexion direction bound together through a conductive flexible plate is used, and one end of the bimorph is fixed and the other free end is mounted to the rotary head, to displace the head in a perpendicular direction with respect to the track longitudinal direction, by varying the height position of the head by use of the piezoelectric ceramic plate which expands at one end and contracts at the other end according to the polarity and the voltage of the applied voltage. Furthermore, head moving mechanisms in which the so-called see-saw operation is performed can also be used, such as that proposed by the present applicant in "MAGNETIC RECORDING AND REPRODUCING APPARATUS WITH DEVICE FOR TRACKING CONTROL OF ROTARY MAGNETIC HEADS", U.S. patent application Ser. No. 178,852. The above head moving mechanisms can be of a construction in which heads are respectively mounted at each tip end parts of mutually opposing swinging members which are unitarily rotated with the rotary drum, to displace the rotary heads in a perpendicular direction with respect to the track longitudinal direction in mutually opposite directions, by subjecting the swinging members to a see-saw operation with the fulcrum member which supports the center part of the swinging members as the fulcrum according to the tracking control signal.

The reproduced signal level is detected as described in the following, when the head 15a is at a trace starting neighborhood point A, intermediate point B, and trace finishing neighborhood point C, shown in FIG. 2. The heads 15a and 15b have respective azimuth gaps 17a and 17b inclined at an azimuth angle $\alpha$ which is mutualy in opposite directions, relative to the direction perpendicular to the scanning direction. The azimuth gaps 17a and 17b have the same track width. The tracks recorded and formed on the tape 10 travelling in the arrow direction X by the head 15a rotating in the arrow direction Y are designated by the characters t1, t3, t5, . . . (wherein the subscripts of t are odd numbers). The tracks recorded and formed by the video head 15b are designated by the characters t2, t4, t6, . . . (wherein the subscripts of t are even numbers). The tracks t1, t2, t3, . . . are in contiguous contact without gaps or guard bands therebetween, whereby the tape utilization efficiency is high. Each track is recorded with a part of a video signal corresponding to substantially one field. A vertical synchronizing signal is positioned near an end of the track. Although not shown, an audio signal and a control signal are recorded respectively at the upper and lower lateral edges of the tape 10 and along tracks 18 and 19 in the longitudinal direction of the tape.

Then, during normal reproduction, the magnetic tape 10 is caused to travel in the X direction at the same speed as at the time of recording, and tracing and reproduction of tracks t1, t3, t5, . . . by the head 15a and the tracks t2, t4, t6, . . . by the head 15b are alternately carried out. In this connection, if the head 15a were to trace the tracks t2, t4, . . . and the head 15b the tracks t1, t3, . . . (that is, if a so-called opposite tracking were to be carried out), there would be almost no reproduction of signals because of azimuth loss. Accordingly, the rotational phases of the rotary heads are ordinarily so controlled by a control signal that a track recorded by a head having a certain gap of azimuth is traced by a head having a gap of the same azimuth angle.

When the head 15a traces the tracks t1, t3, t5, - - - , and passes the above points A, B, and C, the reproduced signal at track parts A1, B1, C1, A2, B2, C2, - - - , is used in the level detection for performing the tracking control.

A first embodiment of a tracking control system according to the present invention will now be described in conjunction with FIG. 3. A voltage generated by a head swinging voltage generator 22 within a head moving control voltage generator 21, is added with a control voltage which will be described later at an adder 23, and then supplied to a head moving mechanism 16 (16a, 16b) and a memory circuit 24. The above head swinging voltage has a frequency of about several to 15 Hz, for example. The head 15a is swung up and down and varied of its height position by the head moving mechanism 16 which is applied with the head swinging voltage. Accordingly, the head 15a is microscopically swung and displaced in a perpendicular direction with respect to the normal track travelling direction.

Accompanied by the swinging motion of the head 15a, the tracing state respective of the tracks t1, t3, t5, ---, varies between a most suitable state and a state in which a slight tracking error is introduced, and thus, the reproduced signal level varies between a maximum level and a lower level. Furthermore, the amplitude of this swing is a small value so that normal reproduction is not interfered.

A frequency modulated (FM) signal reproduced by the head 15a is supplied to an envelope detector 26 through a terminal 25, wherein the signal is subjected to an envelope wave detection. The detected wave output thus obtained from the envelope detector 26 is supplied to sampling circuits 27a, 27b, and 27c within a sampling circuit 27. The sampling circuits 27a through 27c perform the sampling at a point in time identical to when the head 15a traces the track parts A1(A2, ---), B1(B2, ---), and C1(C2, ---) at the positions A, B, and C, by use of gate signals h, i, and j shown in FIGS. 4(H), 4(I), and 4(J) supplied from gate circuits 31a, 31b, and 31c of a controller 30 which will be described later.

The output signals of the sampling circuits 27a through 27c are respectively supplied to memories 28a, 28b, and 28c of a memory circuit 28, and also to comparators 29a, 29b, and 29c of a comparing circuit 29. The outputs of the memories 28a through 28c are respectively supplied to the comparators 29a through 29c. The comparators 29a through 29c respectively compare the presently sampled values supplied from the sampling circuits 27a through 27c with the previously sampled values supplied from the memories 28a through 28c. When the sampled value is detected as being the maximum value, the comparators 29a through 29c respectively supply signals to gate circuits 39a, 39b, and 39c within the controller 30.

Figure 4:
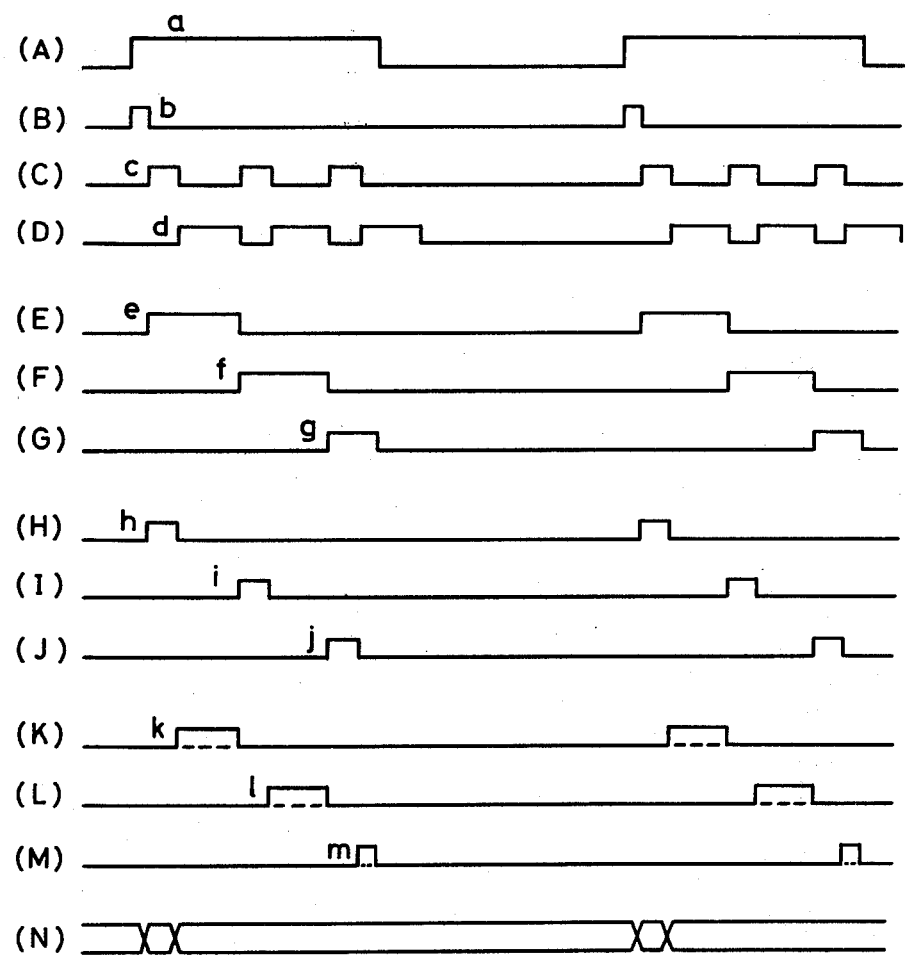
FIGS. 4(A) through 4(N) are graphs respectively showing signal waveforms at each part of the systematic block diagram of FIG. 3.

On the other hand, a drum pulse a shown in FIG. 4(A) generated according to the rotation of the head 15a is applied to a terminal 32 of the controller 30, and supplied respectively to a monostable multivibrator 33, gate circuit 34, and a ring counter 37. The monostable multivibrator 33 supplies an output pulse b shown in FIG. 4(B), and supplied the output pulse to the gate circuit 34. A monostable multivibrator 35 supplied with the output of the gate circuit 34, supplies a pulse c shown in FIG. 4(C) to a monostable multivibrator 36, gate circuits 39a through 39c through an inverter 38, ring counter 37, and gate circuits 31a through 31c. The monostable multivibrator 36 supplies a signal d shown in FIG. 4(D) to the gate circuit 34.

The ring counter 37 supplies a signal e shown in FIG. 4(E) to the gate circuits 31a and 39a, a signal f shown in FIG. 4(F) to the gate circuits 31b and 39b, and a signal g shown in FIG. 4(G) to the gate circuits 31c and 39c, respectively. The gate circuits 31a through 31c respectively supply pulses h, i, and j shown in FIGS. 4(H), 4(I), and 4(J), to the sampling circuits 27a through 27c and switching circuits 41 and 42. Moreover, the pulses h, i, and j comprise timings identical to those at points in time when the head 15a passes the points A, B, and C, and their pulse widths are, for example, approximately 10H to 20H, where H indicates one horizontal scanning period.

In the above block system, every time the head 15a traces the tracks t1, t3, t5, ---, as described above, the sampling circuit 27a reproduced signals SA1, SA2, SA3, ---, at the track parts A1, A2, A3, ---. The level variation in the reproduced signals A1, A2, A3, ---, are shown in FIG. 5(A). The comparator 29a subtracts the presently sampled value SA2 supplied from the sampling circuit 27a, from the previously sampled value SA1 supplied from the memory 28a, and generates a positive output shown in FIG. 5(B) when the result of the above subtraction is positive. However, when the reproduced signal level is beyond the minimum point, the level of the reproduced signal SA4 becomes larger than the previously sampled reproduced signal SA3. Accordingly, the output of the comparator 29a becomes negative at this point. Furthermore, when the reproduced signal level passes beyond the maximum point, the level of the reproduced signal SA9 becomes smaller than the previously sampled reproduced signal SA8. Therefore, at this point, the output of the comparator 29a becomes positive, and the output of the comparator 29a changes from a negative to a positive value, indicating that the maximum point of the reproduced signal level has been detected.

When the maximum reproduced signal level is not detected by the comparator 29a, the output of the gate circuit 39a remains at low level as shown in FIG. 4(K), however, when the maximum reproduced signal level is detected by the comparator 29a as described above, a signal k shown in FIG. 4(K) is supplied to a memory 43a from the gate circuit 39a. Similarly, when the maximum point of the reproduced signal level is detected for the track parts B1, B2, ---, and track parts C1, C2, ---, signals l and m respectively shown in FIGS. 4(L) and 4(M) are respectively applied to memories 43b and 43c from the gate circuits 39b and 39c.

The memories 43a through 43c successively memorize the signal supplied from the adder 23 through the switching circuit 42 which is switched over by the signals h, i and j supplied from the gate circuits 31a through 31c. Accordingly, the memories 43a through 43c respectively memorize the head moving control voltage supplied by the adder 23 at the points in time when the head 15a traces the track parts A1(A2, ---), B1(B2, ---), and C1(C2, ---). The memories 43a through 43c only read out the memorized contents when respectively applied with the signals k, l, m supplied from the gate circuits 39a through 39c, and supply the read-out contents thus obtained to integrators 40a through 40c. Hence, the memories 43a through 43c respectively transmit a head moving control voltage at a point in time when the reproduced signal level becomes maximum, of the points in time when the head 15a traces the track parts A1(A2, ---). B1(B2, ---), and C1(C2, ---), to the integrators 40a through 40c.

When the output signals k, l, and m of the above gate circuits 39a through 39c exist, that is, when the reproduced signal level becomes maximum, a most preferable tracing state is obtained in which the head 15a traces the center of the track parts A1(A2, ---), B1(B2, ---), and C1(C2, ---). Accordingly, in order to continually perform the tracing at the above most preferable tracing state, the contents memorized in the memories 43a through 43c at that time are transmitted to the integrators 40a through 40c.

Moreover, the integrators 40a through 40c are provided in order to minimize the tracking error when the signals obtained during the time when the reproduced signal level is not maximum, are transmitted by mistake from the memories 43a through 43c. Hence, the values which have been integrated several times at the integrators 40a through 40c are supplied to the adder 23 through the switching circuit 41. The head swinging voltage supplied from the above voltage generator 22, and the integrated voltage supplied from the integrators 40a through 40c, are added at the adder 23, and supplied to the above head moving mechanism 16 as a head moving control voltage, and also supplied to the above memory circuit 24.

By supplying the head moving control voltage obtained in the above described manner to the head moving mechanism 16, the heads 15a and 15b slowly swing due to the head swinging voltage generated by the head swinging voltage generator 22, and tracking control is performed so that a most suitable tracking state is obtained in which the heads accurately follow and trace along the bends in the track. Furthermore, the head swinging voltage level is established so that the value is small enough to prevent bad effects on the reproduced signal even when the heads swing.

Shift register and the like having small memory capacity, for example, can be used as the memories 43a through 43c. Moreover, the head moving control voltage generator 21, memory circuit 24, sampling circuit 27, memory circuit 28, comparator 29, controller 30, and the like can be constructed from a microcomputer, by connecting an analog-to-digital (A/D) converter at the output side of the envelope detector 26, and connecting a digital-to-analog (D/A) converter at the input side of the head moving mechanism 16.

Furthermore, since a correlation exists between the bends in the adjacent tracks, in the above embodiment of the invention, the tracking control of the pair of heads 15a and 15b is performed by performing the level detection by use of the reproduced signal of the head 15a. However, the level detection can be performed by use of the respective reproduced signals of the pair of heads 15a and 15b, to respectively control the head moving mechanisms 16a and 16b for the respective heads.

Figure 6:
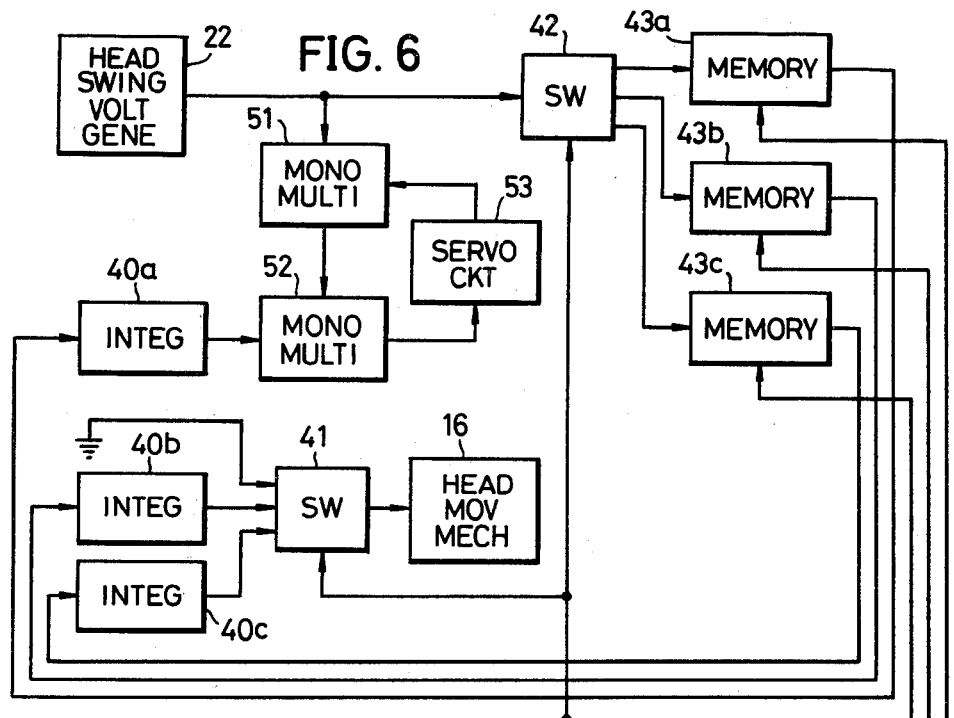
FIG. 6 is a systematic block diagram showing a second embodiment of a tracking control system according to the present invention.

A second embodiment of a tracking control system according to the present invention will now be described in conjunction with FIGS. 6 and 7. In FIG. 6, those parts which are the same as those corresponding parts in FIG. 3 are designated by the like reference numerals and their description will be omitted. In the present embodiment, the switching circuit 41 successively changes over and connects to ground, and the integrators 40b and 40c. Accordingly, when the head 15a traces the track part A1(A2, - - - ), the switching circuit 41 is connected to ground and a control voltage is not applied to the head moving mechanism 16. However, when the head 15a traces the track parts B1(B2, - - - ), and C1(C2, - - - ), the switching circuit 41 is connected to the integrators 40b and 40c, and a control voltage is applied to the head moving mechanism.

Figure 7:
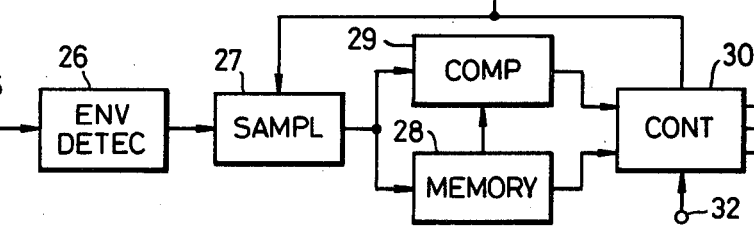
FIG. 7 is a detailed systematic block diagram showing a part of the block system of FIG. 6.

On the other hand, the head swinging voltage supplied from the head swinging voltage generator 22 is supplied to the memories 43a through 43c through the switching circuit 42, and also supplied to a variable time constant monostable multivibrator 51 used as a variable delay circuit shown in FIG. 7, through a terminal 54. A control signal reproduced from a control track on the tape 10 by use a control head 56, is applied to the monostable multivibrator 51 as a trigger pulse through a monostable multivibrator 57. The time constant of the monostable multivibrator 51 is varied according to the head swinging voltage applied thereto as described above, with a period identical to that of the above voltage variation. The output of the monostable multivibrator 51 is applied to a variable time constant monostable multivibrator 52 as a trigger pulse. Moreover, the time constant of the monostable multivibrator 52 is varied according to the output of the integrator 40a supplied through a terminal 55.

The output of the monostable multivibrator 52 is applied to a sampling and holding circuit 58 within a known conventional servo circuit 53, as a sampling pulse. A drum pulse is obtained from a pickup head 59 according to the rotation of the rotary drum 13, and then supplied to a trapezoidal wave generator 61 through a flip-flop 60. The output trapezoidal wave obtained from the trapezoidal wave generator 61 is sampled according to the above sampling pulse at the sampling and holding circuit 58. The output of the above sampling and holding circuit 58 thus obtained is supplied to a motor 63 which rotates the rotary drum 13, through a motor driving amplifier 62, to control the rotation of the motor 63.

As a result of the above operations, when the head 15a traces the track part A1(A2, - - - ), the rotation of the rotary drum 13 is controlled by the servo circuit 53 so that the head 15a performs a most suitable tracking, and when the head 15a traces the track parts B1(B2, - - - ), and C1(C2, - - - ), the head 15a is tracking-controlled by the head moving mechanism 16.

In the above embodiment, the phase of the control pulse reproduced by the head 56, is varied by a swinging voltage at the monostable multivibrator 51, however, the phase of the drum pulse obtained, can be varied by the swinging voltage at the head 59.

Furthermore, the system can be constructed so that the motor 63 is rotated at a constant speed, and the rotation of a capstan motor (not shown) which rotates a capstan for driving the tape 10 is controlled by the output of the motor driving amplifier 62. In this case, wow and flutter could be introduced to present a bad effect on the reproduced audio signal since tape travel fluctuates, however, when the frequency of the swinging voltage is lower than approximately 10 Hz, the problem relating to the wow and flutter is not introduced because by use of the present technology, the effects due to the wow and flutter up to about 10 Hz, can be completely eliminated.

According to the present embodiment of the invention, the displacing quantity of the head can be small, since the voltage applied to the head moving mechanism 16 is only the tracking error compensation voltage. Hence, the present embodiment is especially suited to a system in which the responding operation of the head moving mechanism 16 for displacing the head is slow. Moreover, there is no possibility for the contact state between the head and the tape to be uneven, when the head undergoes displacement by a large quantity.

Figure 8:
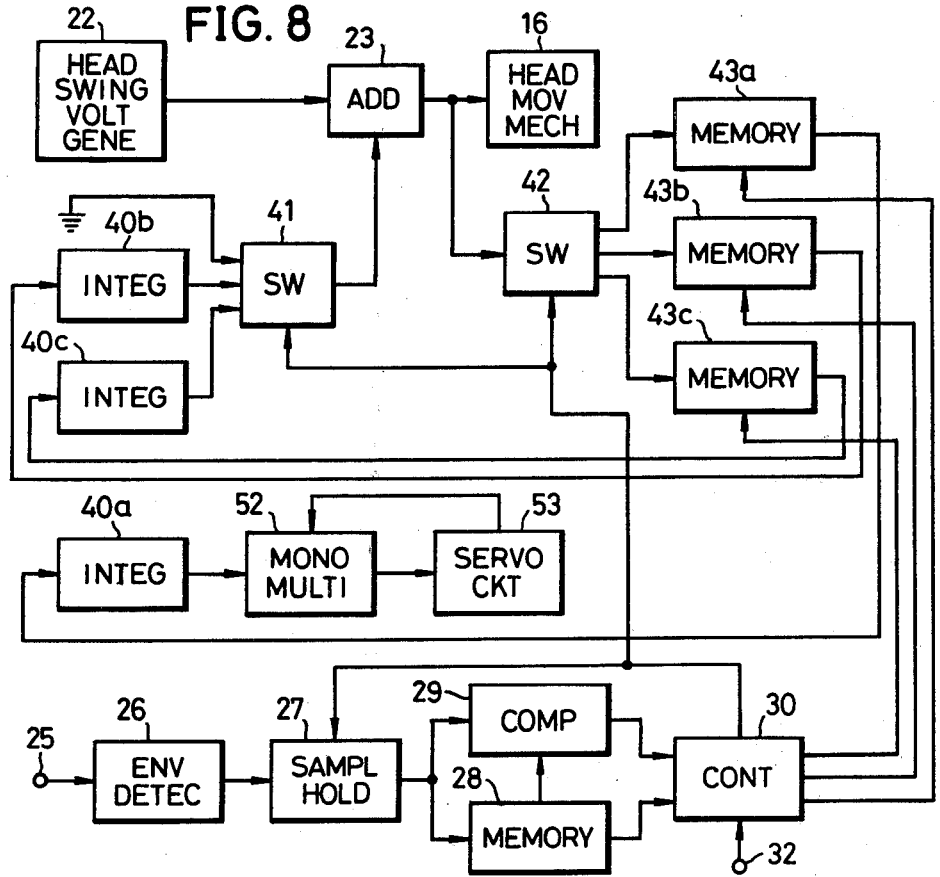
FIG. 8 is a systematic block diagram showing a third embodiment of a tracking control system according to the present invention.

Next, a third embodiment of a tracking control system according to the present invention will be described in conjunction with FIG. 8. In FIG. 8, those parts which are the same as those corresponding parts in FIGS. 3 and 6 are designated by the like reference numerals, and their description will be omitted. The switching circuit 41 changes over between ground and the integrators 40b and 40c, and the output signal of this switching circuit 41 is added with the swinging voltage supplied from the swinging voltage generator 22 at the adder 23. On the other hand, the signal obtained from the memory 43a through the integrator 40a, is applied to the monostable multivibrator 52 which is supplied with a control pulse reproduced by a control head within the servo circuit 53. Hence, the time constant of the monostable multivibrator 52 is accordingly varied. The output of the monostable multivibrator 52 is supplied to the servo circuit 53 having similar construction as that shown in FIG. 7, to control the rotation of the motor which rotates the rotary drum 13.

In each of the above embodiments of the present invention, the system is constructed so that the reproduced signal level upon tracing of the three positions A, B, and C by use of the head 15a is detected, however, detection can be performed at number of positions other than the above three positions, that is, one, two, or more than four positions. As the number of the detection position increases, more accurate tracking control can be performed. Moreover, the system of the present invention is not limited to tracking control of the tracing performed by the head, simply respective of the bends in the track, and can also be applied to tracking compensation control respective of the tracking error introduced inevitably upon reproduction by driving the tape at a different tape travelling speed as that upon recording.

Furthermore, in each of the above embodiments, the FM signal reproduced by the head 15a is simply supplied to the terminal 25, but a signal obtained from the following embodiment which will be described, can be supplied to the terminal 25 instead of the reproduced FM signal.

When reproducing a composite video signal or a luminance signal which is frequency modulated and recorded, the frequency characteristic of the recording and/or reproducing system of the magnetic recording and/or reproducing apparatus is not flat. Furthermore, side band waves can be seen having differing distribution since the frequency of the FM carrier varies according to the contents of the picture, and the amplitude of the FM carrier which is reproduced, is not constant even upon the same tracking state. Upon recording and/or reproducing a single FM signal, the reproducing level increases or decreases proportionally with respect to the rate at which the head is on the track (the area of contact made by the head with respect to the track). However, when an FM composite video signal or a luminance signal is recorded and/or reproduced, the reproducing level also increases or decreases according to the contents of the picture, in addition to the proportional increase or decrease in the reproducing level with respect to the rate at which the head is on the track, and thus, when discrimination is performed on the state of the tracking error by use of a part of the reproduced FM signal level corresponding to the video signal period, the state of the tracking cannot be detected with high accuracy.

The FM carrier frequency of the above FM composite video signal or the luminance signal is constant at parts corresponding to the level of the tip of the synchronizing signal (3.4 MHz, for example), and hence, the level corresponding to the part of the synchronizing signal within the reproduced FM signal is substantially constant regardless of the contents of the picture, when the tracking state is constant. Accordingly, by focusing on the above described points, the present embodiment enables detection of the tracking state of the head with high accuracy, by obtaining only the part corresponding to the above synchronizing signal and detecting the level of the part thus obtained.

Figure 9:
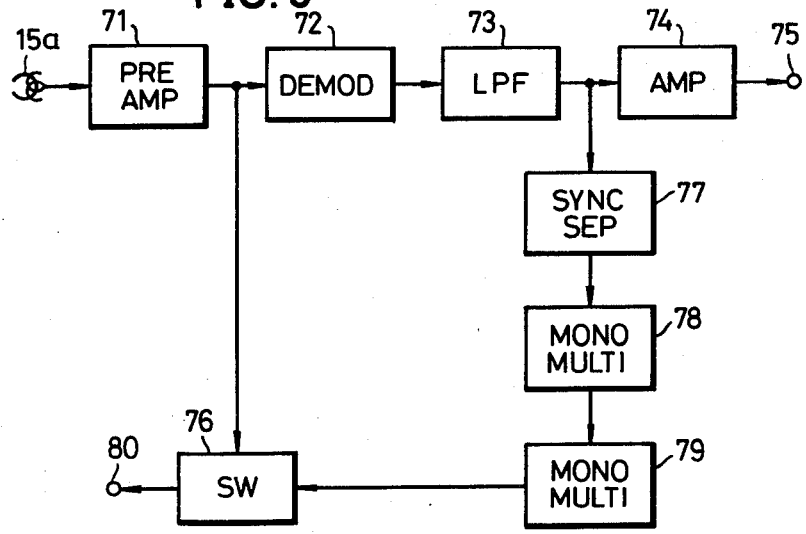
FIG. 9 is a systematic block diagram showing an embodiment of a reproduced signal supplying circuit part.

In FIG. 9, an FM signal reproduced by the head 15a passes through a preamplifier 71, and then supplied to a demodulator 72 wherein the signal is demodulated. The unwanted components of the demodulated signal thus obtained from the demodulator 72 is eliminated at a low-pass filter 73, then amplified at a video amplifier 74, and obtained from an output terminal 75 as a reproduced signal. On the other hand, the output of the low-pass filter 73 is supplied to a synchronizing signal separation circuit 77, wherein the synchronizing signal is separated. The separated synchronizing signal thus obtained successively triggers monostable multivibrators 78 and 79, and the output of the monostable multivibrator 79 is supplied to a switching circuit 76 as a switching pulse. Furthermore, since the reproduced signal passes through the demodulator 72, low-pass filter 73, and synchronizing signal separation circuit 77, the phase of the synchronizing signal separated at the synchronizing signal separation circuit 77 lags compared to the phase of the synchronizing signal within the reproduced signal before the demodulation, and thus the monostable multivibrator 78 is used to adjust the phase. Moreover, the monostable multivibrator 79 is used to adjust the signal extracting width to the width of the synchronizing signal.

The switching circuit 76 passes through the reproduced signal from the preamplifier 71 only during the period of the switching pulse applied from the monostable multivibrator 79, that is, only for the period corresponding to the synchronizing signal. Accordingly, the part corresponding to the synchronizing signal of the reproduced signal is obtained from an output terminal 80. The signal thus obtained is supplied to the input terminal 25 of each of the above embodiments, and the level of this signal is detected at the envelope detector 26.

Figure 10:
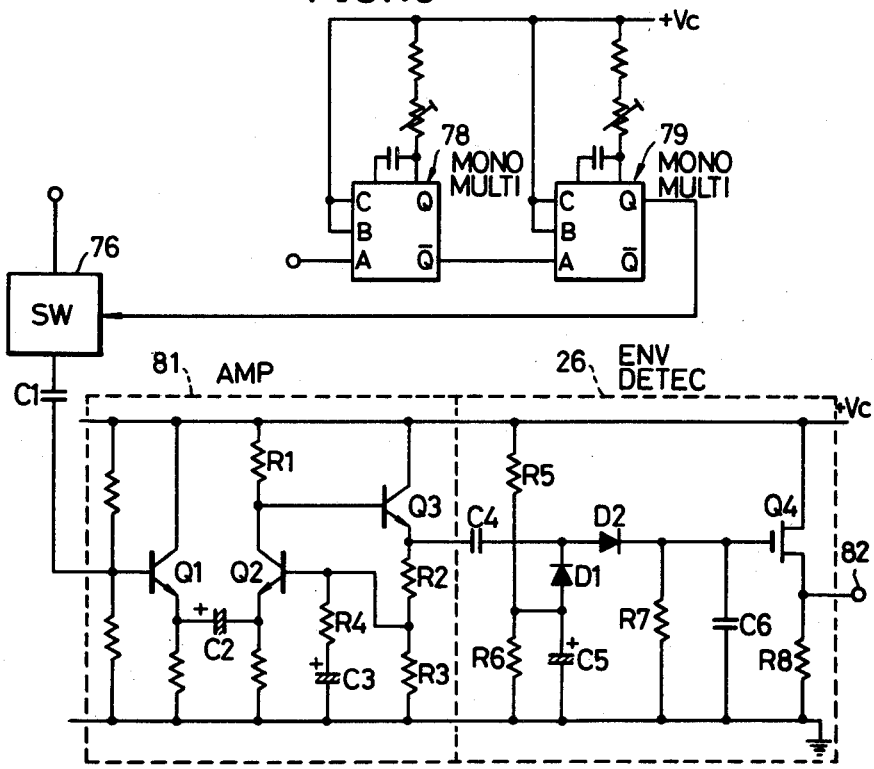
FIG. 10 is a concrete circuit diagram showing a part of the block system of FIG. 9.
Figure 11:
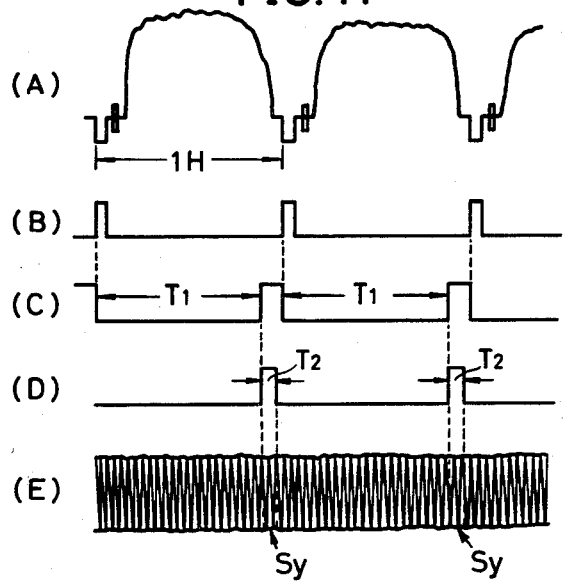
FIGS. 11(A) through 11(E) are graphs respectively showing signal waveforms at each part of the circuit of FIG. 10.

An example of a concrete circuit of a part of the block system of FIG. 9 is shown in FIG. 10. The monostable multivibrators 78 and 79 each comprise input terminals A, B, and C, and output terminals Q and $\overline{Q}$. When the input level at the input terminals B and C are high, and a trigger pulse is applied to the input terminal A, the output Q changes from a low level to a high level at the rising part of the trigger pulse, and returns to a low level after a time determined by the time constant of the monostable multivibrator. Accordingly, when a demodulated video signal such as that shown in FIG. 11(A) is applied to the synchronizing signal separation circuit 77, a synchronizing signal shown in FIG. 11(B) obtained from the synchronizing signal separation circuit 77 is applied to the terminal A of the monostable multivibrator 78 as a trigger pulse. Hence, the level of the output $\overline{Q}$ of the monostable multivibrator 78 becomes low during a predetermined period T1 which is shorter than the interval 1H, as shown in FIG. 11(C), and this output $\overline{Q}$ is applied to the input terminal A of the monostable multivibrator 79 as a trigger pulse. Therefore, the level of the output Q of the monostable multivibrator 79 becomes high from the rising point of the input trigger pulse for a certain period T2, as shown in FIG. 11(D), and this output Q is applied to the switching circuit 76 as a switching pulse. Thus, a corresponding part Sy of the synchronizing signal is extracted from within the FM reproduced signal shown in FIG. 11(E) which is supplied to the switching circuit 76 by the preamplifier 71, and then applied to the base of an NPN-transistor Q1 which constructs an amplifier 81, through a capacitor C1.

The FM reproduced synchronizing signal obtained from the emitter of the transistor Q1 is supplied to the emitter of an NPN-transistor Q2 through a capacitor C2. The FM reproduced synchronizing signal which is amplified and obtained from the connection point between the collector of the transistor Q2 and the collector load resistor R1, is applied to the base of an NPN-transistor Q3, and obtained as output through the emitter of the transistor Q3. Furthermore, the FM reproduced signal which is subjected to voltage division and obtained through the connection point resistors R2 and R3 which are connected in series between the emitter of the transistor Q3 and ground, is fed back through a series connected circuit having a resistor R4 and a capacitor C3 which are connected between the base of the transistor Q2 and ground.

The FM reproduced synchronizing signal which is amplified and obtained from the emitter of the transistor Q3, is subjected to envelope wave detection by the envelope detector 26 comprising resistors R5 through R8, capacitors C5 and C6, diodes D1 and D2, and an field-effect-transistor (FET) Q4 which constructs a source follower, through a connecting capacitor C4. Accordingly, the input FM reproduced synchronizing signal undergoes voltage division by the resistors R5 and R6, and the diode D1 is DC biased by a positive voltage of a predetermined value applied to the anode of the diode D1, due to the positive DC source voltage applied to the capacitor C5. Furthermore, the above signal is rectified by the diodes D1 and D2, and applied to the gate of the FET Q4 through a circuit comprising the resistor R7 and the smoothing capacitor C6. An envelope detected voltage respective of the level of the FM reproduced synchronizing signal, is obtained from the connection point between the source of the FET Q4 and the resistor R8, and supplied to the sampling circuit 27 shown in FIG. 3 through an output terminal 82.

Further, this invention is not limited to these embodiments but various variations and modifications may be made without departing from the scope of the invention.

What is claimed is:

1. A tracking control system in a magnetic reproducing apparatus which comprises a rotary magnetic head for successively reproducing recorded signals from parallel tracks extending obliquely with respect to the longitudinal direction of a magnetic tape, said tracking system comprising:
   head swinging means for varying the height position of said rotary magnetic head, and for swinging the tracing position of said rotary magnetic head with respect to the track on said magnetic tape, said position being displaced in the width direction of said track;
   head swinging voltage generating means for generating a head swinging voltage;
   one or a plurality of memory means for sampling and storing a voltage which is to be supplied to said head swinging means in order to control the height position of said rotary magnetic head, said memory means sampling the voltage at one or a plurality of sampling points at different height positions on one track along the width direction of said magnetic tape;
   level detecting means for detecting the level of a signal reproduced by said rotary magnetic head at points corresponding to the sampling points of said memory means;
   maximum level detecting means for detecting that said level detecting means has detected a maximum level;
   controlling means for reading out the voltage stored in said memory means when said maximum level detecting means detects the maximum level; and
   adding means for adding the voltage read out from said memory means and the head swinging voltage supplied from said head swinging voltage generating means, and for supplying the added voltage to said head swinging means, said maximum level detecting means comprising a memory for temporarily storing the output of said level detecting means, and a comparator means for subtracting and comparing the outputs of said level detecting means and said memory means, to detect the maximum level by inverting the polarity of the subtracted and compared result.

2. A system as claimed in claim 1 which further comprises an integrator means for integrating the voltage read out from said memory means, and for supplying the integrated output thus obtained to said adding means.

3. A system as claimed in claim 1 in which said controlling means is supplied with a signal which is synchronized with the rotation of said rotary magnetic head, and provides an output signal for controlling the level detection points of said level detecting means and the sampling points of said memory means, said controlling means also being supplied with the output of said maximum level detecting means and for producing an output signal for reading out the voltage stored in said memory means.

4. A system as claimed in claim 1 in which said magnetic reproducing apparatus further comprises means for controlling the rotation of said rotary magnetic head, and there exist a plurality of said memory means where one of said plurality of memory means supplies the read out voltage to said means for controlling the rotation of said rotary magnetic head, and the other of said plurality of memory means supply the read out voltage to said adding means.

5. A tracking control system in a magnetic reproducing apparatus which comprises a rotary magnetic head for successively reproducing recorded signals from parallel tracks extending obliquely with respect to the longitudinal direction of a magnetic tape, and rotation control means for controlling the rotation of said rotary magnetic head, said tracking system comprising:
   head displacing means for varying the height position of said rotary magnetic head and for displacing the tracing position on said rotary magnetic head with respect to the track of said magnetic tape, the displacement being in the width direction of said track;
   swinging voltage generating means for generating a swinging voltage;
   a plurality of memory means for sampling and storing the swinging voltage received from said swinging voltage generating means by sampling the swinging voltage at one or a plurality of sampling points at different height positions on one track along the width direction of said magnetic tape;

level detecting means for detecting the level of a signal reproduced by said rotary magnetic head at points corresponding to the sampling points of said plurality of memory means;

maximum level detecting means for detecting that said level detecting means has detected a maximum level;

controlling means for reading out the voltage stored in said plurality of memory means when said level detecting means detects the maximum level;

control signal generating means for obtaining a control signal from the output voltage of one of said plurality of memory means and the output swinging voltage of said swinging voltage generating means, and for supplying said control signal thus obtained to said rotation control means; and means for supplying the output voltages of the other of said plurality of memory means to said head displacing means.

6. A system as claimed in claim 5 in which said rotation control means comprises a motor for rotating said rotary magnetic head, means for reproducing a recorded control pulse from said magnetic tape, detection means for detecting the rotation of said rotary magnetic head, and means for obtaining a signal for controlling the rotation of said motor from the detected output of said detection means and the reproduced control pulse, and said control signal generating means comprises a first monostable multivibrator supplied and triggered by said reproduced control pulse, said first monostable multivibrator being varied of its time constant by the swinging voltage of said swinging voltage generating means, and a second monostable multivibrator supplied and triggered by the output of said first monostable multivibrator, said second monostable multivibrator being varied of its time constant by the output voltage of said one of said plurality of memory means.

* * * * *